United States Patent [19]

Gribble

[11] Patent Number: 5,141,688
[45] Date of Patent: Aug. 25, 1992

[54] METHOD OF MAKING MINERAL-FILLED RESIN PRODUCTS

[75] Inventor: Meirion Gribble, Pontyclun, United Kingdom

[73] Assignee: Olway Industries Limited, Leeds, United Kingdom

[21] Appl. No.: 768,531

[22] PCT Filed: Feb. 2, 1990

[86] PCT No.: PCT/GB90/00152

§ 371 Date: Oct. 3, 1991

§ 102(e) Date: Oct. 3, 1991

[87] PCT Pub. No.: WO90/08643

PCT Pub. Date: Aug. 9, 1990

[30] Foreign Application Priority Data

Feb. 4, 1989 [GB] United Kingdom ............... 8902507

[51] Int. Cl.⁵ ................. B29C 43/02; B29C 47/00; B29C 69/02
[52] U.S. Cl. ................... 264/119; 264/122; 264/DIG. 31
[58] Field of Search ............ 264/119, 120, 122, 296, 264/297.4, 110, DIG. 31

[56] References Cited

U.S. PATENT DOCUMENTS 4,420,351 12/1983 Lussi et al. ................. 156/62.4
5,017,320 5/1991 Velazquez Garcia ............. 264/148

FOREIGN PATENT DOCUMENTS

| 109908 | 5/1984 | European Pat. Off. |
| 2096997 | 3/1972 | France. |
| 2124315 | 9/1972 | France. |
| 2235779 | 6/1977 | France. |
| 8801891 | 5/1988 | Spain. |
| 1041712 | 9/1966 | United Kingdom. |
| 1174952 | 12/1969 | United Kingdom. |
| 1443194 | 7/1976 | United Kingdom. |
| 2058794 | 4/1981 | United Kingdom. |
| 2129002 | 5/1984 | United Kingdom. |

*Primary Examiner*—Mary Lynn Theisen
*Attorney, Agent, or Firm*—Rodman & Rodman

[57] ABSTRACT

A powdered mineral material is thoroughly mixed with a minor proportion of a thermosetting resin material followed by mixing the resulting dough with glass fibre reinforcement. A batch of the resulting formulation is extruded through a rectangular section die to form an extrudate of predetermined length. Several of these lengths are simultaneously pressed in a stack, one above the other, each extrudate between a pair of planar plates, one of which is a cast metal body which has been cast in material bearing an impression of the textured finished building product. The plates are thermostatically heated, at a temperature such that the extruded formulation can be thermally deformed and cured. The resulting mineral-filled resin product is typically a roofing panel.

18 Claims, No Drawings

METHOD OF MAKING MINERAL-FILLED RESIN PRODUCTS

The present invention is concerned with mineral-filled resin products, and methods for the production thereof.

It is known to make mineral-filled resin products, such as roofing tiles, by moulding a mixture of mineral particles and a thermosetting resin. The problem with roofing tiles produced by this method is that they have a "synthetic" appearance, because their surfaces are smooth and uniform.

According to the present invention, there has been devised a method of producing mineral-filled resin products whereby the surfaces of the resulting products have a more natural-looking appearance.

The method according to the invention comprises: thoroughly mixing a powdered mineral material with a minor proportion of a thermosetting resin material; extruding a batch of the resulting formulation, of predetermined weight, through a substantially rectangular section die to form an elongate extrudate of predetermined length; pressing the extrudate between a pair of generally planar plates each substantially of the predetermined length, one of the plates being a cast metal body which has been cast in material bearing an impression of a textured finished building product; and permitting the pressed extrudate to cure.

All the ingredients of the formulation, except the glass fibre, are generally initially mixed together to form a dough, followed by mixing the resulting dough with glass fibre reinforcement.

The resulting reinforced formulation is then weighed out as batches of predetermined weight, which are individually fed to an extruder (the latter being typically hydraulically operated), and extruded in the form of a longitudinally extending, square- or rectangular-sectioned, body of predetermined length. These lengths are then pressed according to the invention between plates, one of which has thereon the impression of a textured finished building product, as described above. It is particularly preferred that a plurality of the extruded lengths are simultaneously pressed in a stack, one above the other, with an alternating stack of the plates described above, such that each extrudate is pressed between a face of one plate have the impression of the textured finished building product, and a further face of a further plate.

The mixing carried out in the method according to the invention is typically carried out by means of a tumbling mixing vessel, preferably provided with interior baffles or agitators. The mixing vessel may, for example, be tumbled about a horizontal axis.

The cast metal body used in the method according to the invention is generally a cast steel plate, which is a reversed facsimile of the original textured finished building product, the latter being typically a roofing panel, such as a slate. It is accordingly preferred that the impression of the textured finished building product is that of a natural slate. Such a steel plate therefore generally includes protuberances corresponding to weakened recesses required in the resulting roofing panel for location of nails to be passed through the formed panel for nailing the latter to rafters or purlins. The steel plate is generally cast in a granular refractory material bearing the required impression. An example of such a granular refractory material is sand, which is traditionally used in the process known as sand casting.

The plates used in the method according to the invention are preferably thermostatically heated, at a temperature such that the extruded formulation can be thermally deformed, and cured. In one embodiment of the invention, the plates may be hollow, with channels therethrough for the flow of heated gas or steam to control the temperature of the plates.

The pressed extrudate may be subsequently allowed to cure, with only the region adjacent each end supported; this ensures that when the final product is a roofing slate, it has a small degree of "sag" corresponding to that desired for this product.

The powdered mineral-filled resin product produced in the method according to the invention may be a roofing panel, such as a slate, a wall-cladding element, a vent slate or the like.

Examples of powdered mineral materials which may be used in the method according to the invention are slate dust, pulverised fly ash, powdered vermiculite or the like.

It is particularly preferred that the powdered mineral material should comprise slate dust; in this embodiment the formulation preferably comprises a major part by weight of slate dust, a minor part by weight of other powdered mineral filler, a minor part by weight of glass fibre, and a thermosetting resin binder, such as a polyester resin.

In a particularly preferred embodiment of the invention, the formulation comprises, in parts per hundred parts by weight of the total formulation:

| | |
|---|---|
| Slate dust | 50 to 70 (e.g. 60) parts |
| Crushed limestone | 10 to 30 (e.g. 15) parts |
| Glass fibre | up to 10 (e.g. 2) parts |
| Stearate (lubricant) | at least 1.0 (e.g. 1.5) parts |
| Polyester resin | 15 to 30 (e.g. 24) parts |

It is preferred that the slate dust and crushed limestone constitute 70 to 85 parts of the formulation, and the glass fibre is preferably present in an amount of at least 1.5 parts per hundred parts by weight of the formulation. It is further preferred that the amount of polyester resin (which is typically an isophthalic-type polyester) should be 9 to 11 parts greater than the number of parts of the glass fibre.

I claim:

1. A method for the production of a mineral powder-filled resin product, which comprises:
    (a) thoroughly mixing a powdered mineral material with a minor proportion of a thermosetting resin material;
    (b) extruding a batch of the resulting formulation, of predetermined weight, through a substantially rectangular section die to form an elongate extrudate of predetermined length;
    (c) pressing said extrudate between a pair of generally planar plates each substantially of said predetermined length, one of said plates being a cast metal body which has been cast in material bearing an impression of a textured finished building product; and
    (d) permitting said pressed extrudate to cure.

2. A method according to claim 1, wherein the ingredients of the formulation are initially mixed together to form a dough, followed by mixing the resulting dough with glass fibre reinforcement.

3. A method according to claim 1, wherein the reinforced formulation is weight out as batches of predetermined weight, which are individually fed to an extruder and extruded in the form of a longitudinally extending, square- or rectangular-sectioned, body of predetermined length.

4. A method according to claim 1, wherein a plurality of the extruded lengths are simultaneously pressed in a stack, one above the other, with an alternating stack of said plates, such that each extrudate is pressed between a face of one plate having the impression of the textured finished building product, and a further face of a further plate.

5. A method according to claim 1, wherein the mixing is carried out by means of a tumbling mixing vessel.

6. A method according to claim 1, wherein the cast metal body is a cast steel plate, which is a reversed facsimile of the original textured finished building product.

7. A method according to claim 1, wherein the impression of the textured finish is of natural slate.

8. A method according to claim 7, wherein the steel plate includes protuberances corresponding to weakened recesses required in the resulting product for location of nails to be passed therethrough.

9. A method according to claim 6, wherein the steel plate has been cast in a granular refractory material bearing the required impression.

10. A method according to claim 9, wherein said refractory material is sand.

11. A method according to claim 1, wherein said plates are thermostatically heated, at a temperature such that the extruded formulation can be thermally deformed, and cured.

12. A method according to claim 1, wherein said plates are hollow, the channels therethrough for the flow of heated gas or steam to control the temperature of the plates.

13. A method according to claim 1, wherein the pressed extrudate is allowed to cure, with only the region adjacent each end supported.

14. A method according to claim 1, wherein the powdered mineral material comprises predominantly slate dust.

15. A method according to claim 14, wherein the formulation comprises a major part by weight of slate dust, a minor part by weight of other powdered mineral filler, a minor part by weight of glass fibre, and a thermosetting resin binder.

16. A method according to claim 14, wherein the formulation comprises, in parts per hundred parts by weight of the total formulation:

| | |
|---|---|
| Slate dust | 50 to 70 parts |
| Crushed limestone | 10 to 30 parts |
| Glass fibre | up to 10 parts |
| Stearate (lubricant) | at least 1.0 parts |
| Polyester resin | 15 to 30 parts |

17. A method according to claim 16, wherein the slate dust and crushed limestone constitute 70 to 85 parts of the formulation, and the glass fibre is present in an amount of at least 1.5 parts per hundred parts by weight of the formulation.

18. A method according to claim 16, wherein the amount of polyester resin is 9 to 11 parts greater than the number of parts of the glass fibre.

* * * * *